United States Patent [19]

Shoup

[11] Patent Number: 4,804,820
[45] Date of Patent: Feb. 14, 1989

[54] METHOD AND APPARATUS FOR CONDUCTING DRIPLESS, SMUT-FREE STUD WELDING

[75] Inventor: Thomas E. Shoup, Amherst, Ohio

[73] Assignee: TRW Inc., Cleveland, Ohio

[21] Appl. No.: 96,646

[22] Filed: Sep. 14, 1987

[51] Int. Cl.⁴ ............................................. B23K 9/20
[52] U.S. Cl. ................................... 219/98; 219/99
[58] Field of Search ......................... 219/98, 99, 137.43

[56] References Cited

U.S. PATENT DOCUMENTS

| | | | |
|---|---|---|---|
| 4,201,904 | 5/1980 | Weidman | 219/98 |
| 4,267,426 | 5/1981 | Mallett | 219/98 |
| 4,284,870 | 8/1981 | Ettinger | 219/99 |
| 4,306,137 | 12/1981 | Shoup et al. | 219/99 |
| 4,317,020 | 2/1982 | Shoup | 219/98 |
| 4,442,336 | 4/1984 | Shoup | 219/98 |
| 4,513,193 | 4/1985 | Ettinger | 219/98 |

FOREIGN PATENT DOCUMENTS 0102278 6/1985 Japan ........................... 219/98

*Primary Examiner*—Clifford C. Shaw
*Attorney, Agent, or Firm*—Allen D. Gutchess, Jr.

[57] ABSTRACT

A method and apparatus are provided for welding a stud to a workpiece and maintaining the area around the weld substantially free of smut. The existence of the smut detracts from the appearance of the workpiece and, if the workpiece is to be painted or otherwise covered with a coating material, the smut must first be removed. A spark shield assembly has an outer end which is placed in contact with the workpiece around the stud. Anti-smut liquid is first deposited from the assembly on the weld area around the end of the stud where the weld occurs thereby to eliminate the deposit of a coating of smut. Air is then directed through the spark shield assembly toward the outer end thereof after the weld is completed to aid in removing the anti-smut liquid from the spark shield assembly.

22 Claims, 3 Drawing Sheets

METHOD AND APPARATUS FOR CONDUCTING DRIPLESS, SMUT-FREE STUD WELDING

This invention relates to a method and apparatus for welding studs to a workpiece to prevent smut from being deposited thereon and for maintaining the stud welding apparatus substantially dry, by supplying anti-smut liquid through a spark shield assembly positioned around the stud and for subsequently directing air through the spark shield assembly toward the workpiece.

When studs are welded to workpieces by a drawn-arc, stud-welding technique, it is not uncommon for a coating of smut to be deposited on the workpiece around the welded end of the stud. This frequency occurs with trim studs which are welded to automobile bodies for the subsequent attachment of clips and trim strips or windshield mounting clips, for example. After the studs are welded and before the clips and trim are applied, the body receives a protective coating such as a primer, and subsequent decorative coatings. If the coating of smut around the welded stud is not first removed from the automobile body, the protective coating will not adhere properly and will separate from the surface. Thus, an extra operation is required to remove the smut after welding and before the first coating is applied.

Apparatus has heretofore been known for welding studs to workpieces without coatings of smut being deposited thereon. Such apparatus can be found in U.S. Pat. Nos. 4,306,137 issued Dec. 15, 1981; 4,317,020 issued Feb. 23, 1982; 4,442,336 issued Apr. 10, 1984; 4,486,644 issued Dec. 4, 1984; and 4,284,870 issued Aug. 18, 1981.

The apparatus heretofore known has, in some instances, utilized a spark shield assembly with a spark shield and an inner sleeve located around the stud and the chuck in which the stud is held. The spark shield assembly has had a plurality of passages directed toward the workpiece with fluid being supplied to the passages. Heretofore, the fluid has consisted of air and an anti-smut liquid which are deposited on the surface of the workpiece at low velocity or in atomized form. With the apparatus heretofore known, the liquid tends to flow back along the spark shield assembly when welding studs overhead, such as to the top portion of a windshield opening of a vehicle or to rocker panels. This liquid has tended to drip from the apparatus and hamper the welding operations as well as being discomforting to the operator.

The method and apparatus in accordance with the invention supply anti-smut liquid to the workpiece surface and, preferably, to the chuck of the welding tool to substantially eliminate coatings of smut being deposited on the workpiece and weld spatter being deposited on the chuck. Also, air is supplied through the spark shield assembly to maintain the apparatus substantially dry and thereby substantially eliminate dripping of anti-smut liquid therefrom. The anti-smut liquid and the air are supplied toward the workpiece and through the spark shield assembly in separate streams. Further, the anti-smut liquid is preferably supplied toward the workpiece surface and onto the chuck prior to the welding of the stud thereto and the air is directed through the spark shield assembly after the weld is substantially completed. The spark shield assembly also has openings therein between the outer and inner surfaces so that liquid on the outer surface of the spark shield can be drawn in through these openings by the Venturi action of the air, thereby preventing dripping of the liquid from the spark shield assembly. The Venturi action also draws air and liquid through the back end of the spark shield and dissipates liquid on the inner surface thereof.

It is, therefore, a principal object of the invention to provide an improved method and apparatus for welding studs to a workpiece without coatings of smut being deposited on the workpiece around the stud and to minimize the deposition of spatter on the welding tool chuck.

Another object of the invention is to provide a method and apparatus for the elimination of coatings of smut around a workpiece surface to which a stud is to be welded and for reducing dripping of liquid from the welding apparatus by directing separate streams of anti-smut liquid and then air toward the workpiece.

A further object of the invention is to provide a method and apparatus for welding studs to a workpiece by directing anti-smut liquid toward the workpiece and subsequently directing air through a spark shield assembly to remove antismut liquid from the apparatus.

Many other objects and advantages of the invention will be apparent from the following detailed description of a preferred embodiment thereof, reference being made to the accompanying drawings in which.

Figure 1:
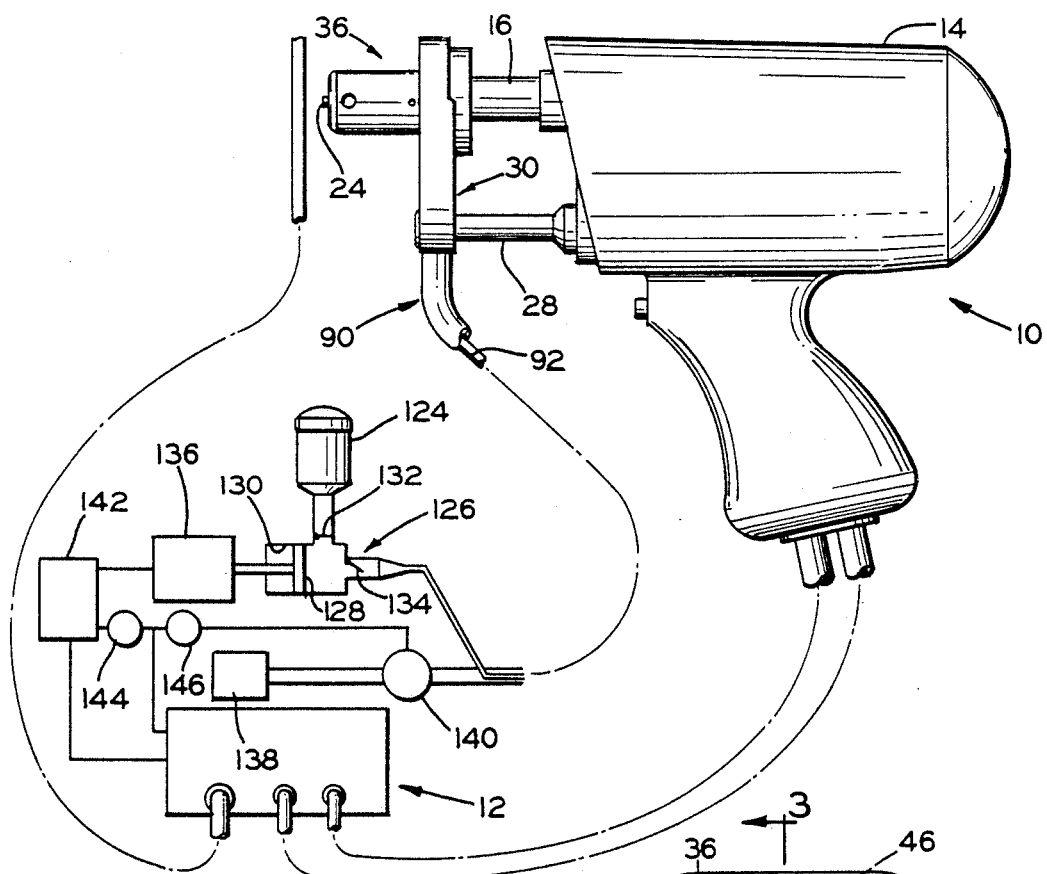
FIG. 1 is an overall schematic view, partly in elevation and partly in section, of apparatus for welding studs in accordance with the invention.

Referring to the drawings, and particularly to FIG. 1, a stud welding tool 10 according to the invention is used to weld a stud to a workpiece by means of a drawn-arc welding technique. The basic tool is known in the art and includes means for retracting a stud from the workpiece, means for holding the stud in the retracted position for a predetermined period of time, and means for moving or plunging the stud toward and against the workpiece at the end of the predetermined period. As the stud is retracted from the workpiece, a pilot arc is drawn between the end of the stud and a main welding arc is subsequently imposed on the pilot arc, with the main welding arc then being maintained until the stud is plunged back against the workpiece. The tool can be of the type shown in U.S. Pat. No. 3,525,846, for example. This tool may utilize a transformer-rectifier type of power source.

Figure 2:
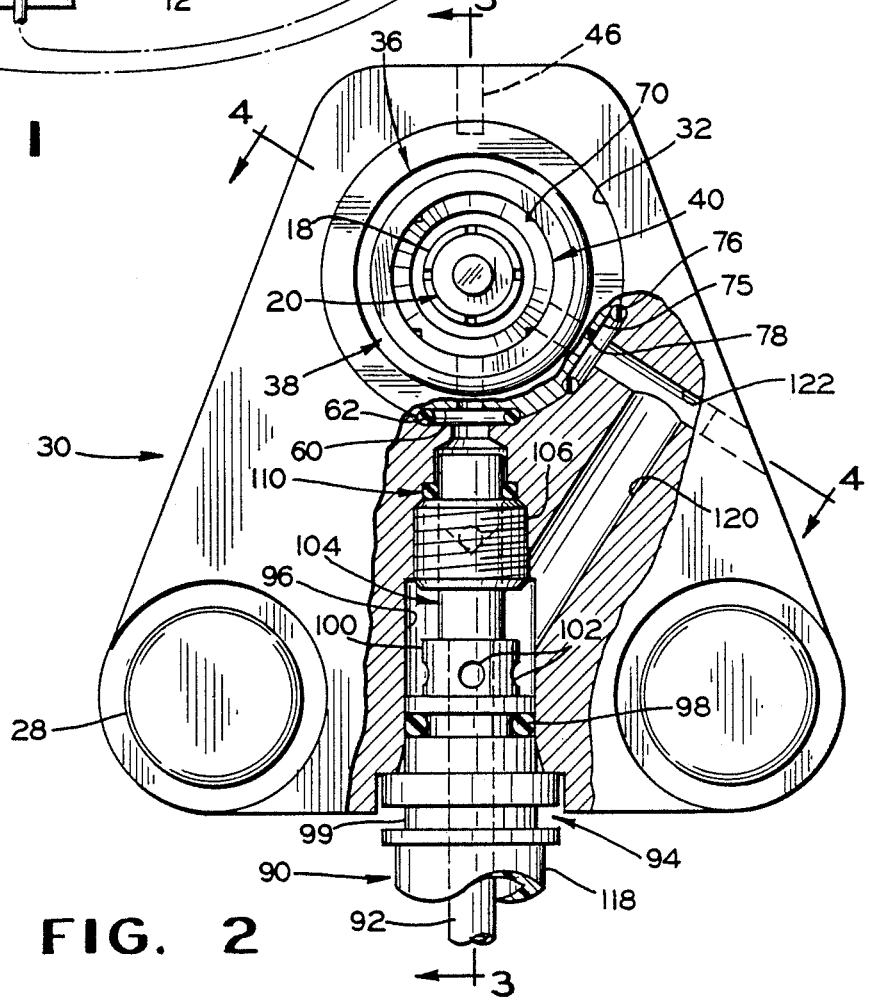
FIG. 2 is an enlarged, front view in elevation, with parts broken away and with parts in cross section, of a welding foot and a spark shield assembly of the apparatus of FIG. 1.
Figure 5:
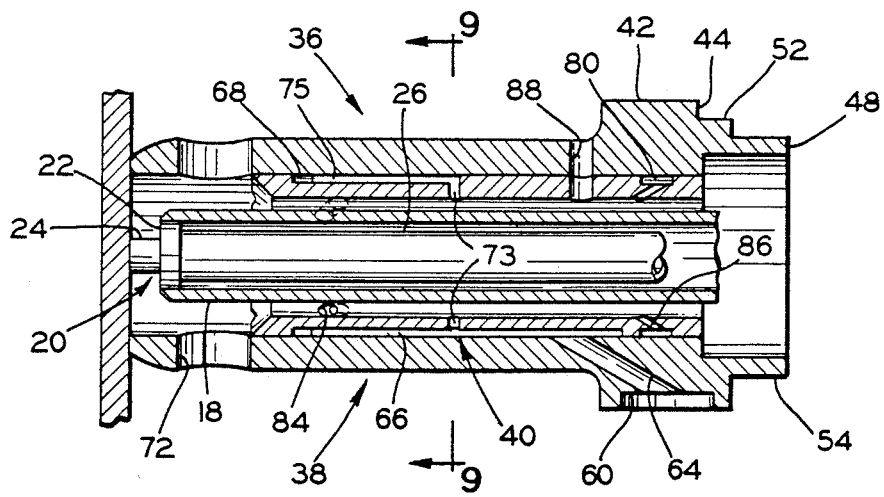
FIG. 5 is a view in longitudinal cross section of the spark shield assembly with a stud and a chuck.
Figure 7:
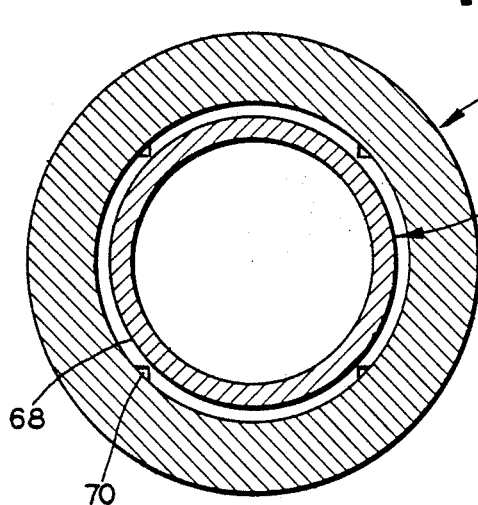
FIG. 7 is a view in transverse cross section taken along the line 7—7 of FIG. 3.

A power and control unit 12 supplies power for the pilot and the main welding arcs and for a solenoid coil in a tool body 14 which retracts the stud against the force of a plunge spring when the coil is energized. A chuck leg 16 extends into the coil and also extends forwardly of the tool body 14 where it is suitably connected to a chuck 18 (FIGS. 2 and 5). In this instance, a trim stud 20 has a head 22 which is held by the chuck 18 and a stem 24 which extends forwardly, with the stud backed up by a suitable adjustable stop 26 during the welding cycle. Studs can be fed into the front of the chuck by hand. They also can be transported by air through a tube from a remote supply source and into a chamber in the chuck leg 16 behind the chuck 18. The studs can then be pushed into the chuck from the chamber by a plunger. The plunger can be connected to a piston and an air cylinder located in the chuck leg to which air is supplied from a remote source. This type of loading arrangement is shown in U.S. Pat. Nos. 3,525,846 and 3,489,878, and does not constitute part of the present invention.

A pair of supporting legs 28 extend forwardly from the welding tool body 14 and support a welding foot 30, being connected thereto in a manner known in the art. The welding foot 30 has a cylindrical opening 32 (FIGS. 2-4) with a rear, inwardly-extending, annular flange 34. A spark shield assembly 36 (FIGS. 2-5) is supported by and extends forwardly from the welding foot 30. The spark shield assembly includes an outer spark shield 38 and an inner, non-metallic sleeve or insert 40. The sleeve 40 can be held in the spark shield 38 with a suitable adhesive or can have a force fit therein. The spark shield 38 has a rear cylindrical hub or body 42 which is received in the cylindrical opening 32 of the welding foot 30. The rear face of the body 42 bears against the inwardly-extending flange 34 of the welding foot and has an upper notch 44 (FIGS. 3 and 5) into which extends a locating pin 46 (FIGS. 2 and 3) in the welding foot 30 to properly orient the spark shield assembly 36 with respect to the foot. The spark shield 38 is positioned by the foot 30 so that the stem 24 of the stud 20 extends slightly beyond the end of the spark shield, as shown in FIG. 1, before the stud is pressed against the workpiece. The end of the spark shield is then pushed into contact with the workpiece, as shown in FIG. 5, with the stud and chuck retracting slightly against the force of a spring in the welding tool body.

Figure 3:
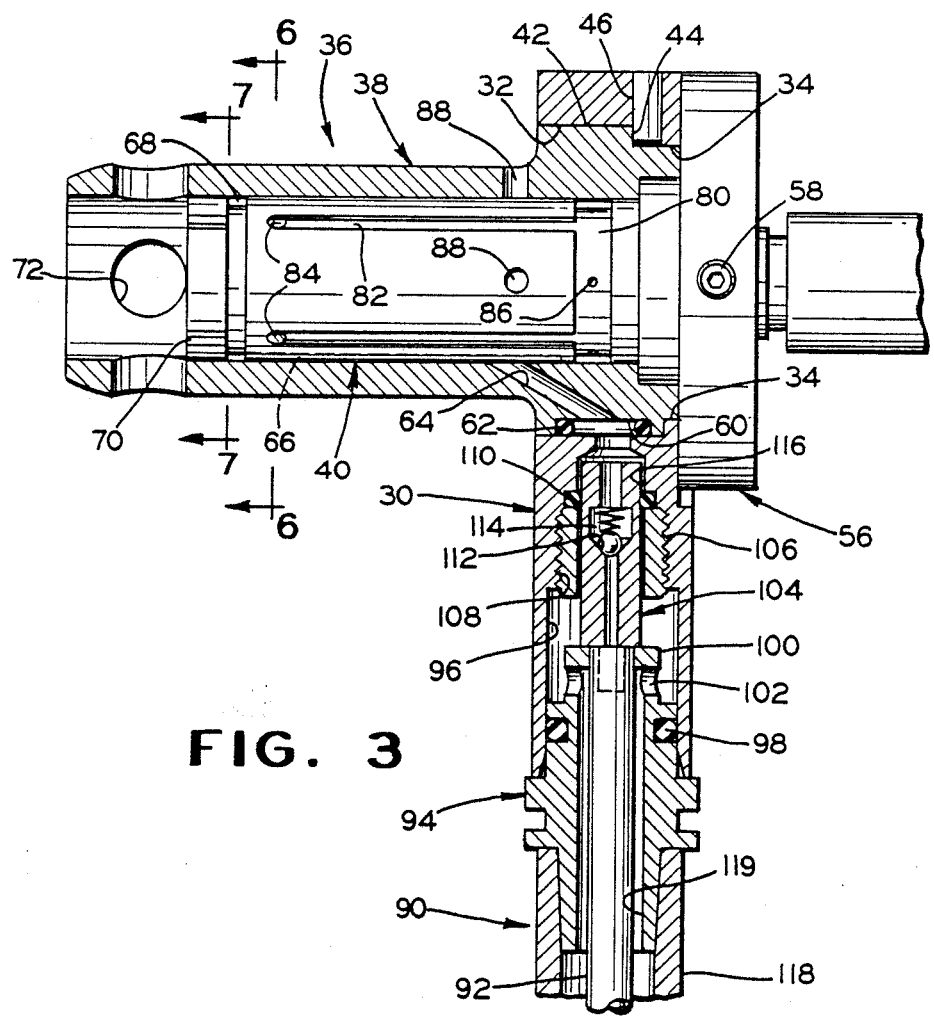
FIG. 3 is a view in vertical cross section, taken generally along the line 3—3 of FIG. 2.
Figure 4:
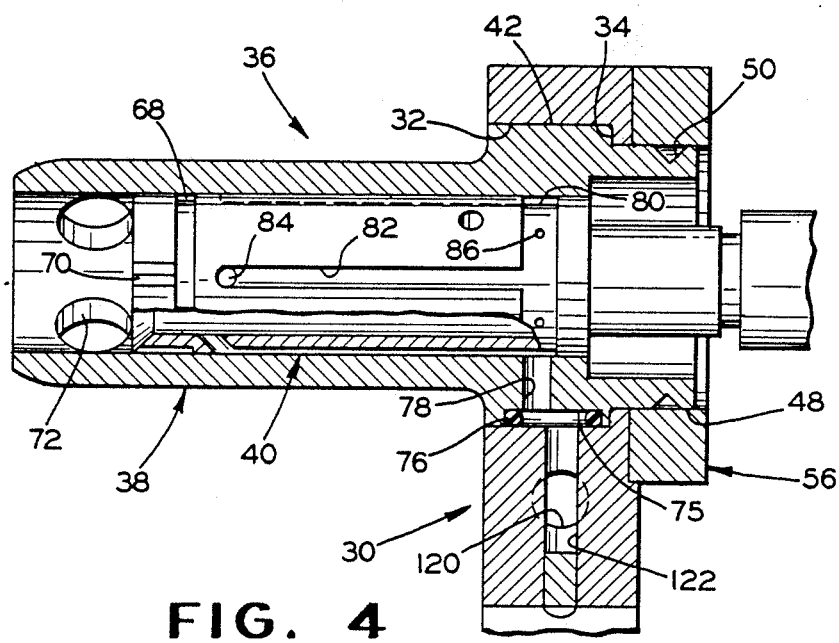
FIG. 4 is a view in cross section, with parts broken away, taken along the line 4—4 of FIG. 2.

For affixing the spark shield assembly 36 to the foot 30, the spark shield 38 has a rearwardly-extending annular neck 48 (FIGS. 4 and 5) having an annular V-shaped groove 50 (FIG. 4) extending therearound except at upper and lower flats 52 and 54 (FIG. 5) on the neck 48. The neck configuration enables the spark shield assembly 36 to be quickly attached to and detached from the welding foot 30 by means of a locking ring 56 (FIGS. 3 and 4). The ring has two diametrically-opposite, pointed setscrews 58 which can be aligned vertically with the flats 52 and 54. The ring is then rotated in either direction to cause the points of the setscrews to move into the groove 50 of the neck 48 with the setscrews then tightened to provide a clamping action between the ring 56, the foot 30, and the neck 50, to hold the spark shield assembly 36 firmly in place.

Figure 6:
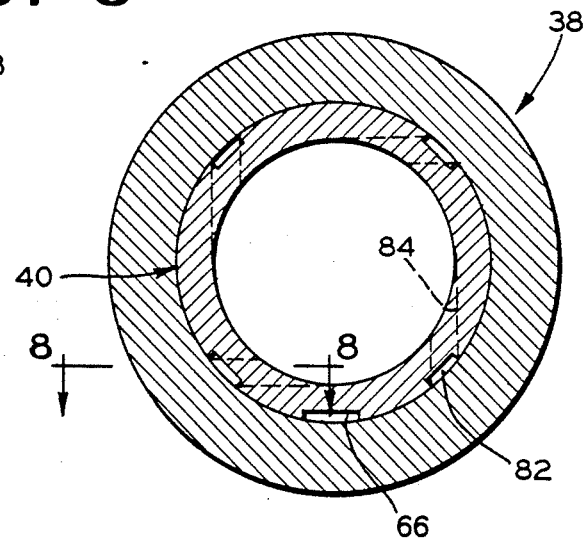
FIG. 6 is a view in transverse cross section taken along the line 6—6 of FIG. 3.
Figure 8:
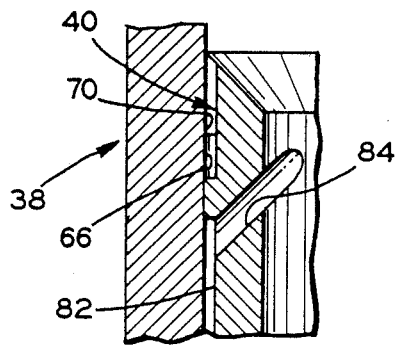
FIG. 8 is a fragmentary view in cross section taken along the line 8—8 of FIG. 6.
Figure 9:
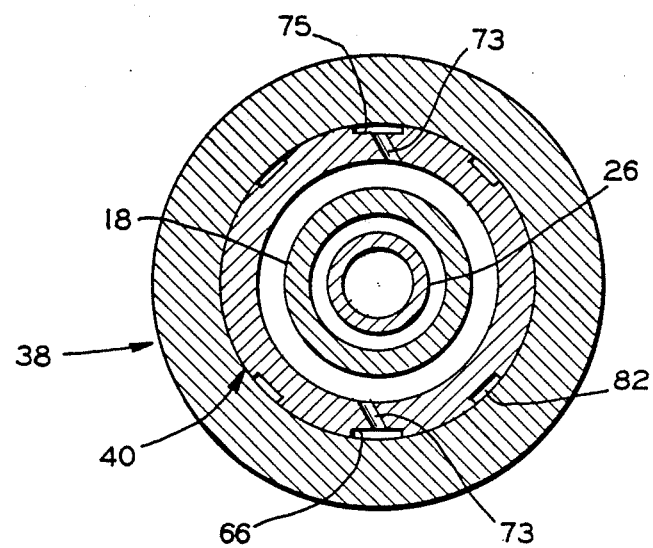
FIG. 9 is a view in transverse cross section taken along the line 9—9 of FIG. 5.

Gas, usually air, and anti-smut liquid are supplied separately to the spark shield assembly 36. The anti-smut liquid is supplied to a circular recess 60 (FIGS. 2, 3, and 5) at the bottom of the cylindrical body 42. A sealing O-ring 62 seals the recess 60 with respect to the surface of the opening 32 of the foot 30. The liquid passes through a diagonal passage 64 (FIGS. 3 and 5) in the spark shield 38 and through a longitudinal passage 66 (FIGS. 3, 5, and 6). From here the liquid flows through an annular manifold 68 (FIGS. 3-5 and 7) to four short longitudinal passages or grooves 70 (FIGS. 2-4 and 7) which are located uniformly around the periphery of the sleeve 40. The passages 70 are about one-eighth inch long and are of ninety degree V-shaped configuration in transverse cross section, measuring 0.018 to 0.020 inch deep. The liquid is directed by these passages in discrete streams or squirts to the surface of the workpiece around the weld area.

The passages 70 are staggered with respect to four vent openings 72 (FIGS. 3-5) in an end portion of the spark shield 38 which enable the escape of gasses during the weld cycle. Notches can also be used in the end of the spark shield for venting, rather than the openings 72. The liquid is preferably applied to the surface of the workpiece just before the welding cycle to prevent smut from being deposited on the surface during the welding cycle.

The anti-smut liquid is also preferably supplied to the outer surface of the chuck 18 at an intermediate portion thereof. This liquid keeps weld spatter from building up on the chuck. Otherwise, the spatter can build up between the chuck and the inner surface of the sleeve 40. To supply this liquid, diametrically-opposite holes or ports 73 supply the liquid as streams toward the chuck, these ports having diameters of about 0.020 inch and being offset from the axis of the chuck to swirl and wet both the outer surface of the chuck 18 and the inner surface of the sleeve 40. One of the passages 73 communicates with the supply passage 66 and the other communicates with a supply passage 74 which supplies liquid from the annular manifold 68. The anti-smut liquid supplied through the ports 73 does not affect the quality of the welds but substantially reduces the spatter build-up.

Gas or air is supplied to a circular recess 75 (FIGS. 2 and 4) in the surface of the cylindrical body 42 which is sealed off from the foot 30 by a sealing O-ring 76. The air travels from the recess 75 through a radial passage 78 (FIGS. 2 and 4) to a rear annular manifold 80 (FIGS. 3-5) in the sleeve 40. From here, the air takes two paths. In one, the air travels through four longitudinal passages 82 located around the periphery of the sleeve 40 to four diagonal ports 84 (FIGS. 3-6 and 8) which communicate with the interior surface of the sleeve 40. These ports 84 direct the air around the inside of the spark shield sleeve in a spiral manner. Preferably, these four ports 84 are angled at thirty degrees to the inner surface of the spark shield and are offset from the center line of the shield. The main function of this air is to blow away excess liquid from the surfaces of the sleeve 40 and the spark shield 38 and also blow liquid and spatter from the outer surfaces of the chuck 18. The diameter of the ports is in the order of 0.025 to 0.055 inch and preferably about 0.032 inch.

The second path of air from the annular manifold 80 is through four angled ports 86 which commute directly with the manifold 80 and with the interior surface of the sleeve 40, being angled at about thirty degrees to the axis of the sleeve and extending longitudinally of the sleeve. These ports have a diameter in the order of 0.010 to 0.030 inch and preferably about 0.020 inch. The streams of air issuing from the ports 86 have a Venturi action, causing excess liquid that runs down the outside of the spark shield to be drawn in through the back end thereof, through the center of the locking ring 56. Three side openings 88, having a diameter about half of that of the vents 72, are also formed through the spark shield 38 and the sleeve 40 at ninety degree angles to one another, and more specifically in the nine o'clock, twelve o'clock, and three o'clock positions as viewed from the front. These openings are closer to the front end of the spark shield 38 than the ports 86 to achieve the Venturi effect. The liquid running down the outside surface of the spark shield 38, when welding overhead, also is drawn in through these openings and blown out the front of the spark shield assembly 36 along with liquid and spatter on the inner surface of the sleeve 40 and on the chuck 18.

The gas and liquid are supplied to the welding foot 30 through a coaxial line 90 (FIGS. 1, 2, and 3). The liquid is supplied through an inner line or tube 92 which extends through a fitting 94 (FIGS. 2 and 3). The fitting 94 is received in a bore 96 of the foot 30 and is sealed by an O-ring 98. A clip (not shown) with a U-shaped notch is affixed to the bottom edge of the foot 30 and is engaged in an annular groove 99 of the fitting 94. An upper end 100 of the fitting 94 has four transverse openings 102 therein. The liquid line 92 communicates with a check valve 104 extending through a fitting 106 which is threaded into an upper recess 108 (FIG. 3) above the bore 96. The check valve 104 is sealed by an O-ring 110 and forms a valve seat 112 against which a spring-loaded ball 114 is normally seated. The lower end of the check valve 104 abuts the upper end of the fitting 94. The check valve 104 prevents the return of liquid into the liquid line 92, that line being continually full of liquid. From the valve 104, the liquid passes into a short supply passage 116 above the threaded recess and from there flows into the circular recess 60 of the spark shield 38.

The gas or air is supplied through an outer line or tube 118 of the coaxial line 90, with the air flowing through a central bore 119 in the fitting 94 and out the transverse openings 102. The air then flows through the upper end of the bore 96 and through an angular passage 120 (FIGS. 2 and 4) to a transverse passage 122. The passage 122 communicates with the circular recess 75 in the spark shield 38 with the air being emitted through the ports 84 and 86 and directed toward the outer end of the spark shield assembly 36.

The anti-smut liquid is supplied to the inner tube 92 from a suitable source 124 (FIG. 1) by a suitable pump 126. The pump includes a piston 128 in a cylinder 130 with an inlet check valve 132 and an outlet check valve 134. Upon each stroke of the piston 128, a small quantity of the anti-smut liquid is supplied under positive pressure to the tube 92. The piston 128 is reciprocated by a suitable drive unit 136, the pump delivering about 0.01 to 0.02 cubic inch of liquid for each weld. The amount of liquid depends on the surface area of the workpiece to be covered and upon the diameter of the spark shield 38.

The air is supplied to the outer tube 118 from a suitable source 138. The flow of the air is controlled by a valve 140 and the air preferably is supplied at a full line pressure of about 70–100 PSI. The drive unit 136 for the pump 126 and the valve 140 can be actuated manually or can be operated automatically through a timer control 142 which coordinates with the welding controls 12. In the actual welding sequence, the welding tool trigger activates the timer control 142 which actuates the drive unit 136 and a short delay timer 144. This timer then activates the welding control 12 and starts a second delay timer 146. The duration of this timer is slightly longer than the weld cycle of control 12. Upon timing out, the air valve 140 is energized for an interval sufficient to expel accumulated fluid from the front of the spark shield.

The anti-smut liquid is supplied through the four ports 70 toward the outer end of the spark shield 38 and the surface of the workpiece around the weld area preferably in discrete streams, preferably one shot of liquid being supplied through one reciprocatory movement pump piston 128. This liquid is preferably applied immediately before the welding cycle and is of such short duration that the time is not noticeable to the operator, when accomplished automatically.

The valve 140 is not opened to supply air through the ports 84 and 86 until after the welding cycle is substantially completed. Otherwise, the air tends to cause turbulence and extinguish the welding arc. The air is blown through the ports for about one-half to three-quarters of a second to dissipate the anti-smut liquid. This delay does not hamper the welding operations by the operator, with a goal of twenty-five to forty welds per minute being the rate commonly desired. Unless the operator is slow, the air is directed through the spark shield assembly after it has been removed from the workpiece.

Various modifications of the above-described embodiment of the invention wil be apparent to those skilled in the art and it is to be understood that such modifications can be made without departing from the scope of the invention, if they are within the spirit and the tenor of the accompanying claims.

I claim:

1. Apparatus for welding a stud to a surface of a workpiece with the surface around the stud being maintained substantially free of contaminant coatings, said apparatus comprising a welding tool having means for holding the stud, means for establishing a welding arc between the stud and the workpiece, and means for moving the stud toward and away from the workpiece, a spark shield assembly having an outer end adapted to contact the workpiece surface around the stud, said assembly having first passage means for directing anti-smut liquid toward the workpiece surface, said spark shield assembly having second passage means with ends for directing gas toward the outer end of said assembly, said assembly having third passage means with ends for directing gas toward the surface of the workpiece, said third passage means being located farther from the outer end of said spark shield assembly than ends of said second passage means, liquid means for supplying only anti-smut liquid to said first passage means, and gas means for supplying only gas under pressure to said second and said third passage means.

2. Apparatus according to claim 1 characterized by said liquid supply means having control means for supplying the liquid to said first passage means prior to welding the stud to the surface.

3. Apparatus according to claim 2 characterized by said gas supply means including control means for supplying gas under pressure to said second and said third passage means substantially after the stud is welded to the surface.

4. Apparatus according to claim 1 characterized by said gas supply means including control means for supplying gas under pressure to said second and said third passage means substantially after the stud is welded to the surface.

5. Apparatus according to claim 1 characterized by said spark shield assembly including an outer spark shield having vent openings adjacent the outer end which contacts the surface and an inner non-metallic sleeve in said spark shield.

6. Apparatus according to claim 1 characterized by said spark shield assembly having a plurality of openings extending between an inner surface and an outer surface thereof and located closer to the end of said spark shield assembly which contacts the workpiece surface than the ends of third said passage means.

7. Apparatus according to claim 1 characterized by said second and third passage means comprising a plurality of passages for directing the gas toward the surface of the workpiece in a plurality of separate streams.

8. Apparatus according to claim 1 characterized by said first passage means comprising a plurality of separate passages for directing the anti-smut liquid toward the workpiece surface in a plurality of separate streams.

9. Apparatus according to claim 8 characterized by said second passage means comprising a plurality of separate second passages for directing the gas toward the workpiece surface in a plurality of streams.

10. Apparatus according to claim 1 characterized by said second passage means comprising a plurality of separate second passages for directing the gas toward the workpiece surface in a plurality of streams.

11. Apparatus for use with a stud welding tool for welding a stud to a surface of a workpiece with the surface around the stud being maintained substantially free of contaminant coatings, said apparatus comprising a spark shield assembly having a first end adapted to contact the surface of the workpiece around the stud, said first end having vent means for enabling the escape of gasses during the welding cycle, said assembly having first passage means for directing anti-smut liquid toward the workpiece surface in separate streams, said spark shield assembly having second passage means for directing gas toward the first end in separate streams, and said spark shield assembly having third passage means with ends spaced farther from said first end than ends of said second passage means for directing additional gas toward the first end of said spark shield assembly.

12. Apparatus according to claim 11 characterized by said spark shield assmebly having openings extending between outer and inner surfaces thereof, said openings being located between the ends of said second passage means and the ends of said third passage means.

13. Apparatus according to claim 12 characterized by the ends of said third passage means being positioned and angled in an manner to cause a Venturi effect to draw liquid on the outer surface of said spark shield assembly into said assembly through said openings.

14. Apparatus according to claim 11 characterized by said spark shield assembly having means at a second end thereof for connecting said assembly to a welding foot of the welding tool, said connecting means having supply passage means for supplying only anti-smut liquid to said first passage means and having additional supply passage means for supplying only gas to said second passage means and said third passage means.

15. Apparatus according to claim 11 characterized by the ends of said second passage means being angled in a manner to cause the gas to be directed toward the workpiece in a spiral manner.

16. Apparatus according to claim 11 characterized by said spark shield assembly having foruth passage means with ends spaced farther from said first end of said spark shield assembly than ends of said first passage means for directing anti-smut liquid to the interior of said spark shield assembly.

17. Apparatus according to claim 16 characterized by said fourth passage means directing the anti-smut liquid in separate streams.

18. In a method of welding a stud to a workpiece surface with the surface of the workpiece around the stud being maintained substantially free of smut, said method comprising holding a stud against the surface, placing an end of a spark shield against the surface around the stud, withdrawing the stud from the surface, establishing a welding arc between the end of the stud and the surface, and moving the stud back toward the surface, the improvement comprising directing an anti-smut liquid toward the surface in a first plurality of separate streams around the location of the weld prior to withdrawing the stud from the surface, directing additional anti-smut liquid to the interior of the spark shield in a second plurality of streams from locations spaced farther from the surface than the locations of the first plurality, and subsequently directing gas toward said end of said spark shield after the stud has been moved back to the surface.

19. In a method according to claim 18, the improvement further comprising directing the gas toward the spark shield end in a plurality of stream.

20. In a method according to claim 18, the improvement further comprising directing the gas toward the spark shield end in a first plurality of streams from locations spaced from the surface and in a second plurality of streams from locations spaced farther from the surface than the locations of the first plurality of gas streams.

21. Apparatus for welding a stud to a surface of a workpiece with the surface around the stud being maintained substantially free of contaminant coatings, said apparatus comprising a welding tool having means for holding the stud, means for establishing a welding arc between the stud and the workpiece, and means for moving the stud toward and away from the workpiece, a spark shield assembly having an outer end adapted to contact the workpiece surface around the stud, said assembly having first passage means with ends for directing anti-smut liquid toward the workpiece surface, said spark shield assembly having second passage means for directing gas toward the outer end of said assembly, said spark shield assembly having third passage means for directing antismut liquid around said stud holding means, said third passage means being located farther from the outer end of said spark shield assembly than the ends of said first passage means, liquid means for supplying only anti-smut liquid to said first and said third passage means, and gas means for supplying only gas under pressure to said second passage means.

22. Apparatus according to claim 21 characterized by said third passage means comprising a plurality of passages for directing the liquid in separate streams around said stud holding means.

* * * * *

UNITED STATES PATENT AND TRADEMARK OFFICE
CERTIFICATE OF CORRECTION

PATENT NO. : 4,804,820
DATED : February 14, 1989
INVENTOR(S) : Thomas E. Shoup

It is certified that error appears in the above-identified patent and that said Letters Patent is hereby corrected as shown below:

Column 1, line 16, change "frequency" to --frequently--.

Column 2, line 23, change "antismut" to --anti-smut--.

Column 7, line 11, change "third said" to --said third--.

Column 7, line 47, claim 12, line 2, change "assmebly" to --assembly--.

Column 8, line 4, claim 16, line 4, change "foruth" to --fourth--.

Column 8, line 54, claim 21, line 15, change "antismut" to --anti-smut--.

Signed and Sealed this

First Day of August, 1989

Attest:

DONALD J. QUIGG

Attesting Officer

Commissioner of Patents and Trademarks